US005671995A

United States Patent [19]

Serizawa et al.

[11] Patent Number: 5,671,995

[45] Date of Patent: Sep. 30, 1997

[54] HEADLAMP FOR MOTOR VEHICLES

[75] Inventors: Hiroyuki Serizawa; Hiroyuki Takatsuka, both of Shizuoka, Japan

[73] Assignee: Koito Manufacturing Co., Ltd., Tokyo, Japan

[21] Appl. No.: 558,484

[22] Filed: Nov. 16, 1995

[30] Foreign Application Priority Data

Nov. 18, 1994 [JP] Japan .................................... 6-285042

[51] Int. Cl.$^6$ ................................ B60Q 1/14; B60Q 1/16

[52] U.S. Cl. ............................ 362/61; 362/293; 362/297; 362/304

[58] Field of Search .............................. 362/61, 293, 302, 362/304, 297, 347, 255

[56] References Cited

U.S. PATENT DOCUMENTS

| | | | |
|---|---|---|---|
| 4,928,214 | 5/1990 | Oyama | 362/302 |
| 5,299,101 | 3/1994 | Serizawa | 362/61 |
| 5,303,126 | 4/1994 | Taniuchi | 362/302 |
| 5,465,195 | 11/1995 | Jenner et al. | 362/293 |

FOREIGN PATENT DOCUMENTS

| | | | |
|---|---|---|---|
| 1597925 | 10/1970 | Germany | 362/255 |

*Primary Examiner*—Ira S. Lazarus
*Assistant Examiner*—Sara Sachie Raab
*Attorney, Agent, or Firm*—Sughrue, Mion, Zinn, Macpeak and Seas

[57] ABSTRACT

A paraboloidal effective reflecting surface of a reflector is divided into an upper effective reflecting surface for forming a preset pattern of the low beam and a lower effective reflecting surface for forming a preset pattern for supplementing the pattern. First shades for forming clear cutting lines of the low beams is disposed close to an arc tube as a light source. The glare caused by the reflection of light on the upper effective reflecting surface is reduced. The resultant clear cutting lines are sharp. The second shades, which are provided outside the first shades, cut the light beams that pass above the first shades and direct to the partition lines (stepped parts). As a result, no glare is caused by the reflection of light at the partition lines.

22 Claims, 15 Drawing Sheets

HEADLAMP FOR MOTOR VEHICLES

BACKGROUND OF THE INVENTION

1. FIELD OF THE INVENTION

The present invention relates to a headlamp for motor vehicles of the type in which a discharge bulb of the metal-halide type as a light source is disposed at a position close to the focal point of an effective reflecting surface of a paraboloidal reflector. More particularly, the invention relates to a headlamp for motor vehicles for forming low beams in which shades that contribute to formation of clear-cut lines of the low beams are disposed on both sides of the discharge bulb.

2. RELATED ART

FIG. 23 is a front view showing the reflector of a proposed headlamp disclosed in Published Unexamined Japanese Patent Application No. Hei. 5-217403. A discharge bulb 3 with an arc tube 3*a* extending longitudinally or to the fore side and to the rear side is inserted into a bulb insertion hole 2 of a reflector 1 having a paraboloidal effective reflecting surface. Light emits from the arc tube 3*a*, reflecting on the effective reflecting surface of the reflector 1, led forward, and diffused by the light distribution control steps formed on a front lens (not shown), located in front of the reflector 1. The effective reflecting surface of the reflector 1 is divided into an upper effective reflecting surface 1*a* for forming a light distribution pattern of the low beam having a preset clear cut line, and a lower effective reflecting surface 1*b*, somewhat different in shape from the upper effective reflecting surface 1*a*, for illuminating on a preset area of the light distribution pattern of the low beam. A given low beam is formed by the light reflected on the substantially entire effective reflecting surface (1*a* and 1*b*) of the reflector 1.

The shape of the upper effective reflecting surface 1*a* is slightly different from that of the lower effective reflecting surface 1*b*. Because of this, partition lines (stepped parts) 4 and 4 are horizontally formed. A couple of web-like shades 5, longitudinally extending, are provided on both sides of the discharge bulb 3. The web-like shades 5 cut light beams that contribute to form clear cut lines of the low beams, and direct to the partition lines 4, to thereby prevent the undesired glare caused by the reflection by the partition lines 4 and 4. In FIG. 23, the shades formed by the web-like shades 5 are indicated by hatching lines.

In the proposed headlamp described above, since the web-like shades 5 are disposed apart from the discharge bulb 3, the web-like shades 5 cannot cut a light beam $L_1$ that emits from a point P1 lower than the center O between the electrodes of the sealed glass bulb 3*a* and direct upward, as shown in FIG. 24 that is an enlarged view of the arc tube and its vicinity in FIG. 23. As shown in FIG. 25, it is reflected on the upper effective reflecting surface 1*a*, and directed above the optical axis L of the lamp, giving rise to unwanted glare.

To solve the glare problem, the present inventors have proposed a unique headlamp. In the headlamp, the web-like shades 5 are located close to the discharge bulb 3 to cut the light beam emitting from a point lower than the electrode center O and directed to the upper effective reflecting surface 1*a*, and hence to prevent the glare caused by the reflection by the upper effective reflecting surface 1*a*.

However, as shown in FIG. 26, an arc 8 serving as a light source developed between the paired electrodes of the discharge bulb 3 is curved outward. Therefore, if the web-like shades 5 is made close to the light source (arc tube), the glare caused by the reflection by the upper effective reflecting surface 1*a* is not caused (the clear cutting line of the low beam is sharp). However, as shown in FIG. 24, a light beam $L_2$ emitting from the top P2 of the sealed glass bulb 3 passes above the upper edges of the web-like shades 5, and reach the partition lines 4 of the reflector. It is reflected by the partition lines 4, to thereby possibly give rise to glare light $L'_2$.

SUMMARY OF THE INVENTION

Accordingly, an object of the present invention is to provide a headlamp for motor vehicles which is free from the glare caused by the partition lines that partition the upper and the lower effective reflecting surfaces of a reflector, and provides sharp clear cutting lines of the lower beams.

The present inventors paid attention to the following two functions of the previously proposed shades; a first function to form the clear cutting lines of the lower beams, and a second function to cut the light beams directed to the partition lines for preventing the glare. The inventors found the following facts. The conventional shades are divided into two shades; first shades having mainly the first function, and second shades having mainly the second function. When the first shades are disposed close to the arc tube, the amount of the glare light caused by the reflection by the upper effective reflecting surface 1*a* is reduced, to thereby form sharp clear cutting lines. When the first shades are made close to the light source, the amount of light passing above the first shades to direct to the partition lines is increased. However, such light can be completely cut by the second shades. The present invention is based on the above facts.

The above and other objects can be achieved by a provision of, according to the present invention, a headlamp for motor vehicles having a paraboloidal effective reflecting surface, a discharge bulb disposed such that the center (referred to as an electrode center) between paired electrodes oppositely disposed in a sealed glass tube for an arc tube is substantially coincident with the focal point of the effective reflecting surface, and a front lens provided in front of the effective reflecting surface, in which the effective reflecting surface is divided into an upper effective reflecting surface of which the focal point is positioned at a point somewhat closer to the effective reflecting surface than the electrode center, and a lower effective reflecting surface of which the focal point is positioned at a point somewhat closer to the front lens than the electrode center, and a pair of web-like shades are disposed on both sides of the arc tube, the paired shades being for cutting light beams that are directed from the sealed glass tube to the partition lines which partition the upper and the lower effective reflecting surfaces, and contribute to formation of clear cutting lines of the low beams, characterized in that said shades include a pair of first shades, disposed close to the arc tube, for cutting a light beam that emits from the lower side of the sealed glass tube and directs to the upper effective reflecting surface, and a pair of second shades, disposed outside and close to said first shades, for cutting light beams that emit from the sealed glass tube and direct to the partition lines without being intercepted by said first shades.

Further, the upper edges of said second shades may be lower than a plane containing the electrode center and the upper edges of said first shades. Furthermore, the arc tube of the discharge bulb may be enclosed with a glass globe for cutting ultra-violet rays, and said first shades are light-cut coatings applied to the globe for cutting ultra-violet rays.

In the headlamp for motor vehicles of the present invention, the first shades, which is located close to the arc tube, surely cuts the light beam that emits from a position lower than the electrode center of the sealed glass tube and directs to the upper effective reflecting surface. Accordingly, no glare is caused by the reflection of light on the effective reflecting surface. The low beam having a sharp clear cutting line is formed.

Since the first shades is located close to the arc tube, the amount of light passing above the first shades to direct to the partition lines is increased. However, such light is surely cut by the second shades provided outside the first shades. Accordingly, no glare is caused by the reflection of light on the effective reflecting surface. The first and the second shades are both located close to the arc tube. This leads to size reduction of the shade structure.

Further, since the upper edges of said second shades are lower than a plane containing the electrode center and the upper edges of said first shades, the second shade does not interrupt the formation of the clear cutting line by the first shade. The clear cutting line of the low beam is sharp. Furthermore, since the first shades are formed integrally with the globe for cutting ultra-violet rays, there is no need of the work to mount the first shades.

DESCRIPTION OF THE PREFERRED EMBODIMENTS

The preferred embodiments of a headlamp for motor vehicles according to the present invention will now be described in detail with reference to the accompanying drawings.

Figure 1:
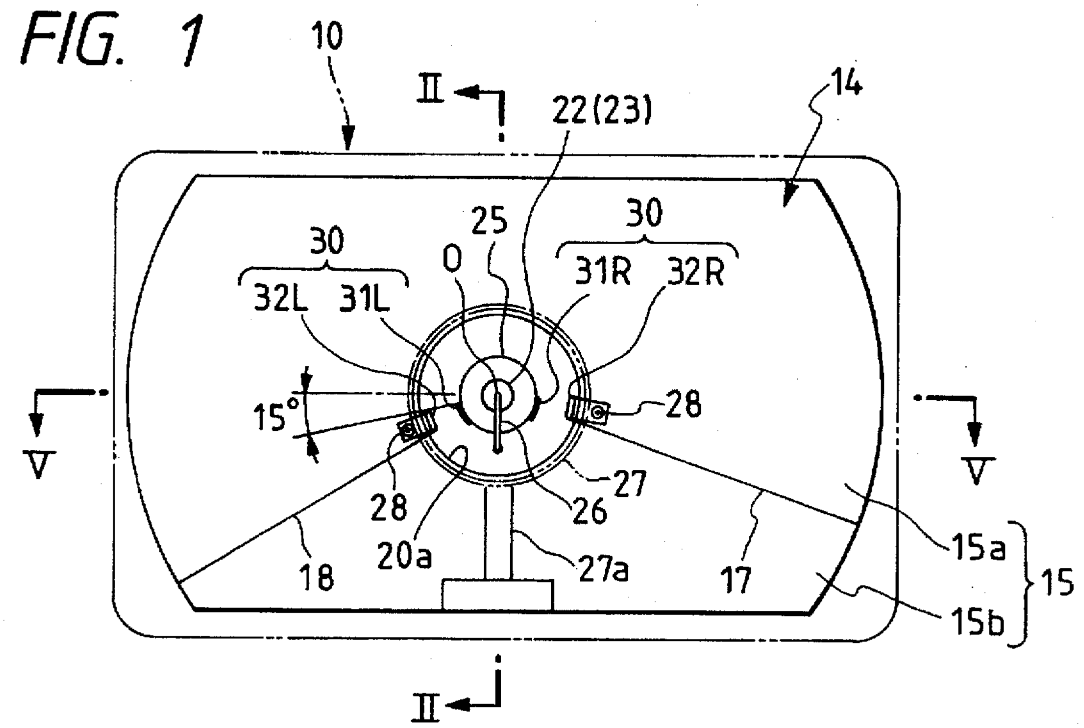
FIG. 1 is a front view showing a headlamp for motor vehicles according to an embodiment of the present invention.
Figure 2:
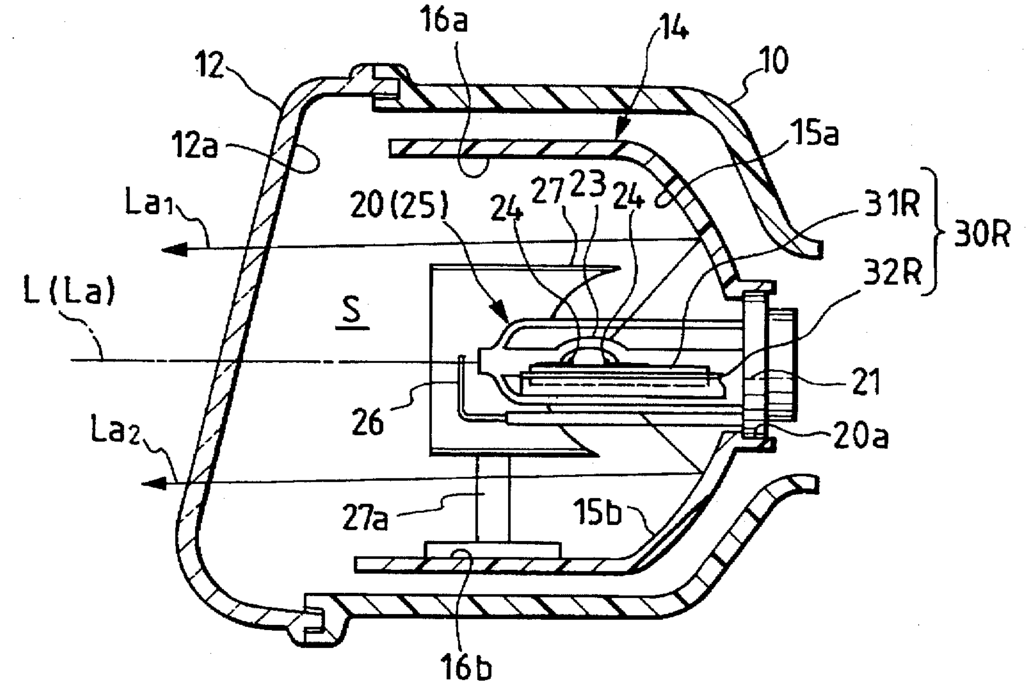
FIG. 2 is a longitudinal sectional view showing the headlamp (taken on line II—II in FIG. 1)
Figure 3:
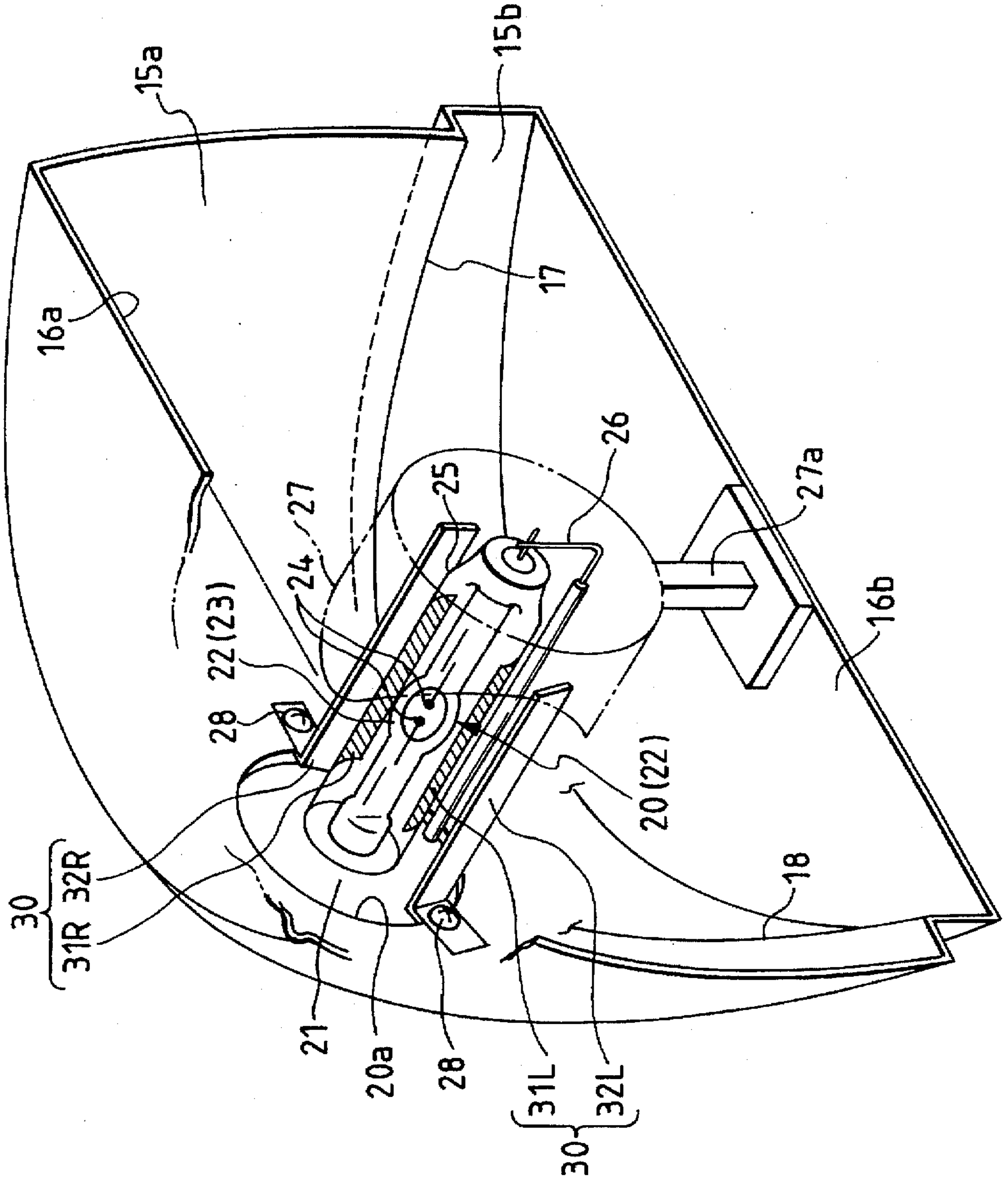
FIG. 3 is a perspective view showing a reflector with a shade structure mounted thereon.
Figure 4:
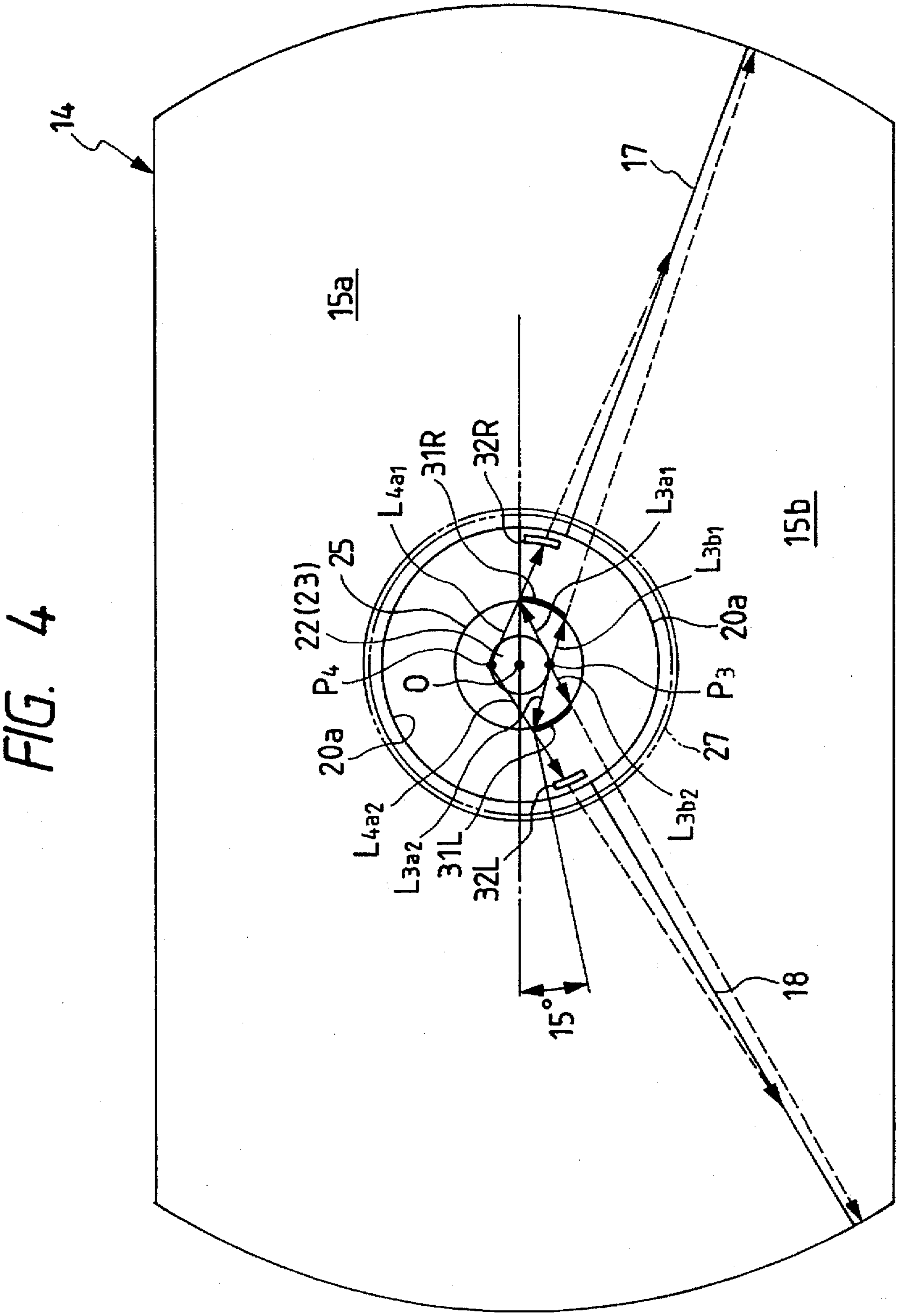
FIG. 4 is a view for explaining the operation of the shade.
Figure 5:
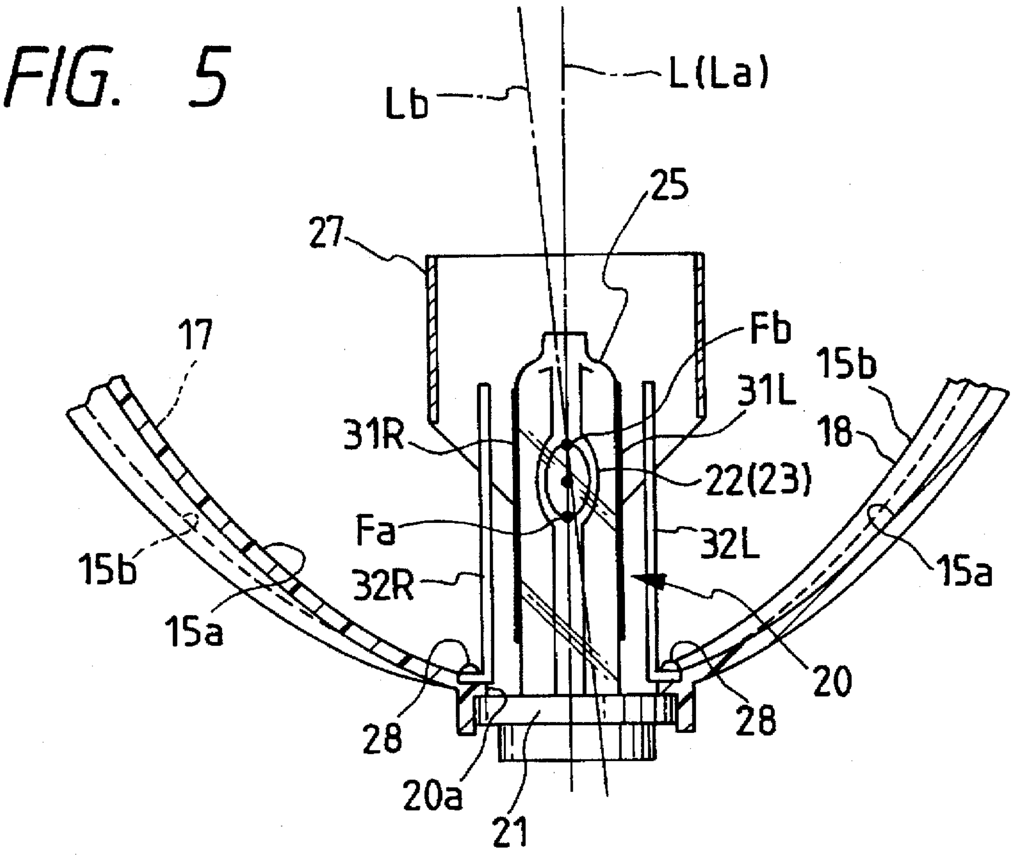
FIG. 5 is a horizontal sectional view showing the reflector (taken on line V—V in FIG. 1) when viewed from the rear side of the reflector.
Figure 6:
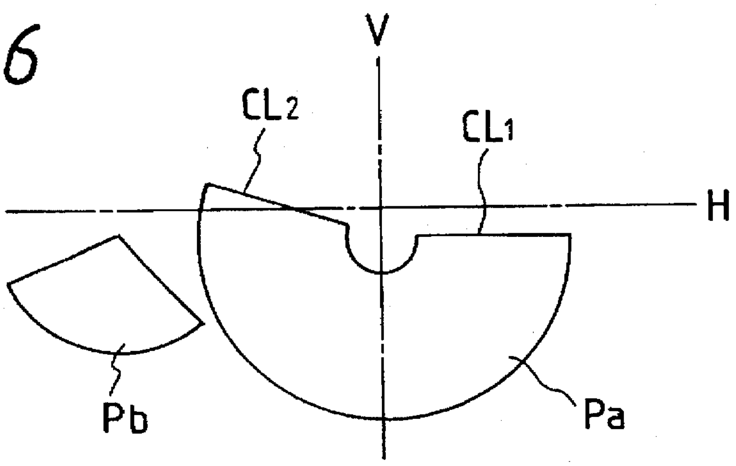
FIG. 6 is a view showing light distribution patterns formed by the reflector of the headlamp of the first embodiment.

FIGS. 1 through 6 show a first embodiment of a headlamp for motor vehicles according to the present invention. Of these figures, FIG. 1 is a front view showing the headlamp, FIG. 2 is a longitudinal sectional view showing the headlamp (taken on line II—II in FIG. 1), FIG. 3 is a perspective view showing a reflector with a shade structure mounted thereon, FIG. 4 is a view for explaining the operation of the shade, FIG. 5 is a horizontal sectional view showing the reflector (taken on line V—V in FIG. 1) when viewed from the rear side of the reflector, and FIG. 6 is a view showing light distribution patterns formed by the reflector of the headlamp.

A cup-shaped lamp body 10 includes a front lens 12 mounted on the front opening of the lamp body 10, to thereby form a bulb chamber S, and a reflector 14 to which a discharge bulb 20 (as a light source) is coupled, which is contained in the bulb chamber S. The reflector 14 may be horizontally and vertically tilted by an aiming mechanism, not shown. Reference numeral *20a* designates a bulb insertion hole formed at the rear top of the reflector 14.

In the structure of the discharge bulb 20, as shown in FIG. 5, an arc tube 22 extends forward from an insulation base 21, and a sealed glass bulb 23 of the arc tube contains a pair of electrodes 24 and 24 (FIG. 2), oppositely disposed, and rare gas for initiation, mercury, metal iodine, and the like. Light beam emits when arc discharge takes place between the paired electrodes. A globe 25 for cutting ultraviolet rays, which encloses the arc tube 22, entirely covers the arc tube 22. The globe 25 and arc tube 22 are integrally formed by bonding. Of light beams radiating from the sealed glass bulb 23, light rays in the wave-length region, e.g., ultraviolet rays, detrimental to the human body are filtered out by the globe 25. The rear end of the arc tube 22, which is integrally formed with the globe 25, inserts into and fixed to the insulation base 21, while the fore end of which is supported by a lead support 26 extending from the insulation base 21. Thus, the arc tube 22 is mounted on the insulation base 21.

The sealed glass bulb 23 is located at a point near to the focal point of the effective reflecting surface of the reflector 14. The light beams emitting from the sealed glass bulb 23 are reflected by the effective reflecting surface of the reflector 14. The reflection collimates the light beams. The collimated light beams then hit on a diffusion step 12*a* that is formed on the rear side of the front lens 12. The light beams are diffused in a preset horizontal range by the diffusion step 12*a*, and distributed forward in the diffused state.

The reflector 14 includes non-effective reflecting surfaces 16*a* and 16*b*, which do not contribute to formation of a light distribution pattern of the headlamp. Light from the discharge bulb 20 is not led to the noneffective reflecting surfaces 16*a* and 16*b* since the surfaces are shaded with the rear wall of the reflector 14 and a cylindrical shade 27. Incidentally, the paraboloidal effective reflecting surface 15 contributes to formation of the light distribution pattern.

Reference numeral 27*a* designates a leg of the cylindrical shade 27. The cylindrical shade 27 is mounted on the lower wall of the reflector 14 by the leg 27*a*. To manufacture the cylindrical shade 27, an aluminum plated iron plate is baked to be colored black, and shaped into a cylindrical body.

The paraboloidal effective reflecting surface 15 is divided into an upper effective reflecting surface 15*a* and a lower effective reflecting surface 15*b* as shown in FIG. 5. The focal point Fa of the upper effective reflecting surface 15*a* is positioned at a point somewhat closer to the rear side (to the reflector 14) than the center O (as the center of a light source) between the electrodes on the optical axis. The optical axis La of the upper effective reflecting surface 15*a* is coincident with the optical axis L of the headlamp. The focal point Fb of the lower effective reflecting surface 15*b* is positioned at a point somewhat closer to the fore side (to the front lens 12) than the electrode center O on the optical axis. The optical axis Lb of the lower effective reflecting surface 15*b* is slanted 9° to the fore side. As shown in FIG. 2, light Lal reflected by the upper effective reflecting surface 15*a* is directed slightly downward with respect to the optical axis L of the headlamp, and contributes to form a light distribution pattern Pa of the low beam (FIG. 6).

The light beam $La_2$ reflected by the lower effective reflecting surface 15*b* is also directed slightly downward with respect to the optical axis L, and slanted 9° to the left with respect to the optical axis L when seen from the driver's position, to thereby contribute to form a light distribution pattern Pb (FIG. 6), and to expand the light distribution pattern of the low beam to the road shoulder of the running lane. Accordingly, the driver clearly sees the road shoulder of the running lane. In the present embodiment, the angle of the slanting of the optical axes La and Lb to the right and the left is 9°. The angle within 3° to 9° is tolerable, as confirmed.

On the paraboloidal effective reflecting surface 15, partition lines (stepped parts) 17 and 18 extend obliquely downward to the right and left from the bulb insertion hole 20*a* since the shapes of the upper and the lower effective reflecting surfaces 15*a* and 15*b* are different from each other. Shades 30 are provided on both sides of the discharge bulb 20. The shades 30 cut part of light emitting from the sealed glass bulb 23, to thereby form the low beam of a clear cutting line, and cut the light directed to the partition lines 17 and 18, which leads to glare.

In the construction of the shades 30, a couple of first shades 31 (31L and 31R) are disposed closer to the arc tube 22, and contribute mainly to form the clear cutting line of the light distribution pattern of the low beam. A couple of second shades (32L and 32R) are disposed outside the first shades 31, and cut mainly the light directed to the partition lines 17 and 18, which demarcate the upper and the lower reflecting surfaces.

The first shades 31, located closer to the ultraviolet-rays cutting globe 25, are coated with material for cutting light, which contains alumina ($Al_2O_3$) or silica ($SiO_2$). The upper edge of the first shade 31R, located on the right side when seeing the front of the reflector 14, is on a horizontal line including the electrode center O, as shown in FIG. 4. Therefore, the right first shade 31R surely cuts a light beam L3*a*1, which emits from a position lower than the electrode center O of the sealed glass bulb 23 and directs to the upper effective reflecting surface 15*a*. As a result, no glare takes place. Further, a horizontal clear cutting line CL1 is sharply formed on the opposing running lane side (FIG. 6). The lower edge of the right first shade 31R extends to a point where it cuts a light beam L3*b*1 that emits from the bottom center P3 of the sealed glass bulb 23 and directs to the partition line 17. Accordingly, there is no chance that light emitting from the lower side of the sealed glass bulb 23 is reflected on the partition line 17, thereby giving rise to glare.

The upper edge of the first shade 31L, located on the left side when seeing the front of the reflector 14, is on a line slanted down 15° with respect to the electrode center O, as shown in FIG. 4. The upper edge of the left first shade 31L cuts a light beam $L_3a_2$ that emits from a point near the bottom center of the sealed glass bulb 23 and directs to the upper effective reflecting surface 15*a* ($L_3a_2$: this light beam is greatly deviated above the clear cutting line CL2 after it is reflected by the upper effective reflecting surface 15*a*, and hence possibly gives rise to glare). As a result, a clear cutting line CL2, which is slanted 15° downward to the right when viewing in the drawing and has a reduced amount of glare light, is formed on the running lane side. The upper edge of the left first shade 31L is lower than the upper edge of the right first shade 31R. Because of this, the upper edge of the left first shade 31L cannot cut all of the light beams emitting upward from a point lower than the electrode center O.

The light beam that emits upward from a point near to the electrode center O is reflected on the upper effective reflecting surface 15*a*, and passes in the vicinity of the clear cutting line CL2. This beam does not give rise to glare, and hence creates no problem. The lower edge of the left first shade 31L or the left second shade 32L extend up to a position where it cuts a light beam $L_3b_2$ that emits from the bottom center P3 of the sealed glass bulb 23 and directs to the partition line 18. Accordingly, there is no chance that light emitting from the lower side of the sealed glass bulb 23 is reflected on the partition line 18, thereby giving rise to glare.

The second shades 32R and 32L are shaped like metal webs, which are made of the same material as of the cylindrical shade 27. The bases of those shades are secured, by means of screws 28, to the part near circumferential edge of the bulb insertion hole 20*a*. Those shades 32R and 32L are arranged in parallel with the first shades 31R and 31L. The upper edges of the second shades 32R and 32L are positioned so as to surely cut light beams $L_4a_1$ and $L_4a_2$ that emit from the top center P4 of the sealed glass bulb 23, pass above the first shades 31R and 31L, and direct to the partition lines 17 and 18. The upper edge of the second shade 32R (32L) are flush with a plane including the electrode center O and the upper edge of the right first shade 31R (31L) or lower than the plane. Accordingly, provision of the second shade 32R (32L) does not interrupt the formation of the clear cutting line CL1 (CL2) by the first shade 31R (31L).

Figure 7:
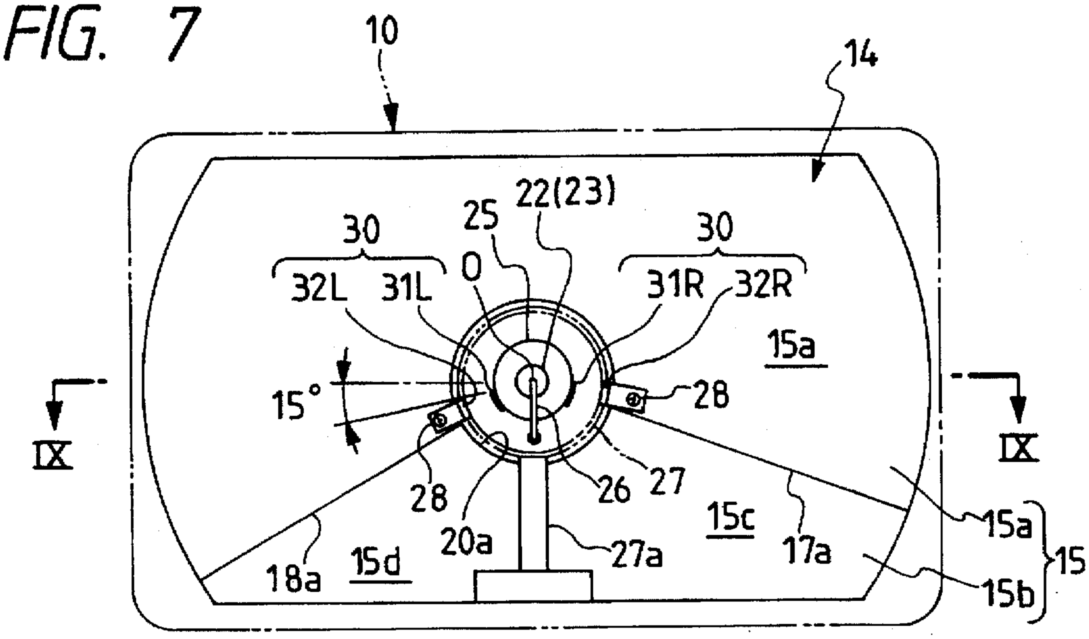
FIG. 7 is a front view showing a headlamp for motor vehicles according to a second embodiment of the present invention.
Figure 9:
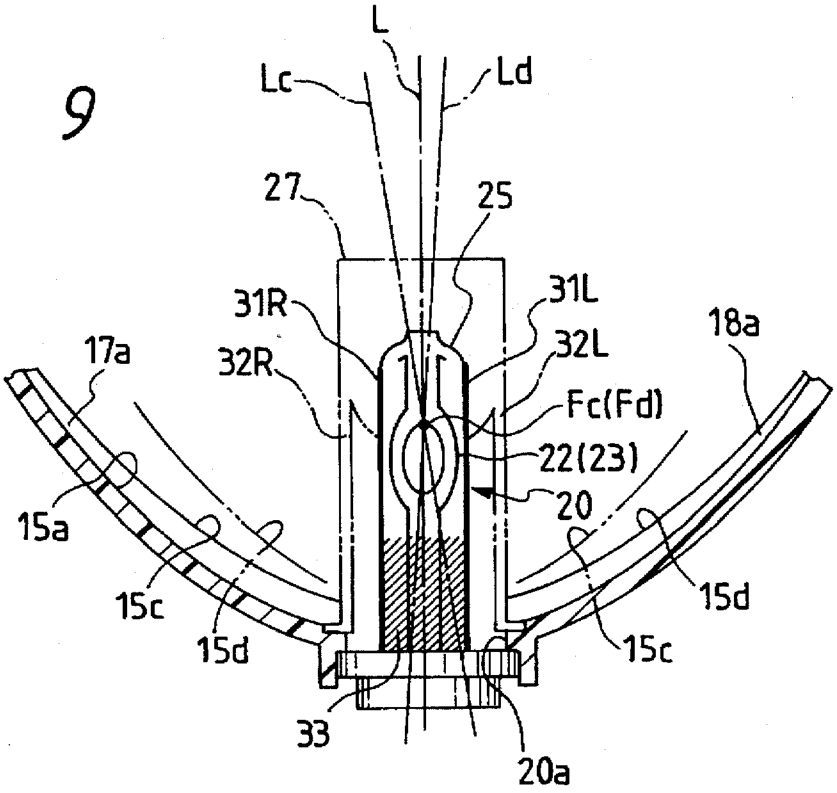
FIG. 9 is a horizontal sectional view showing the reflector (taken on line IX—IX in FIG. 7) when viewed from the rear side of the reflector.
Figure 8:
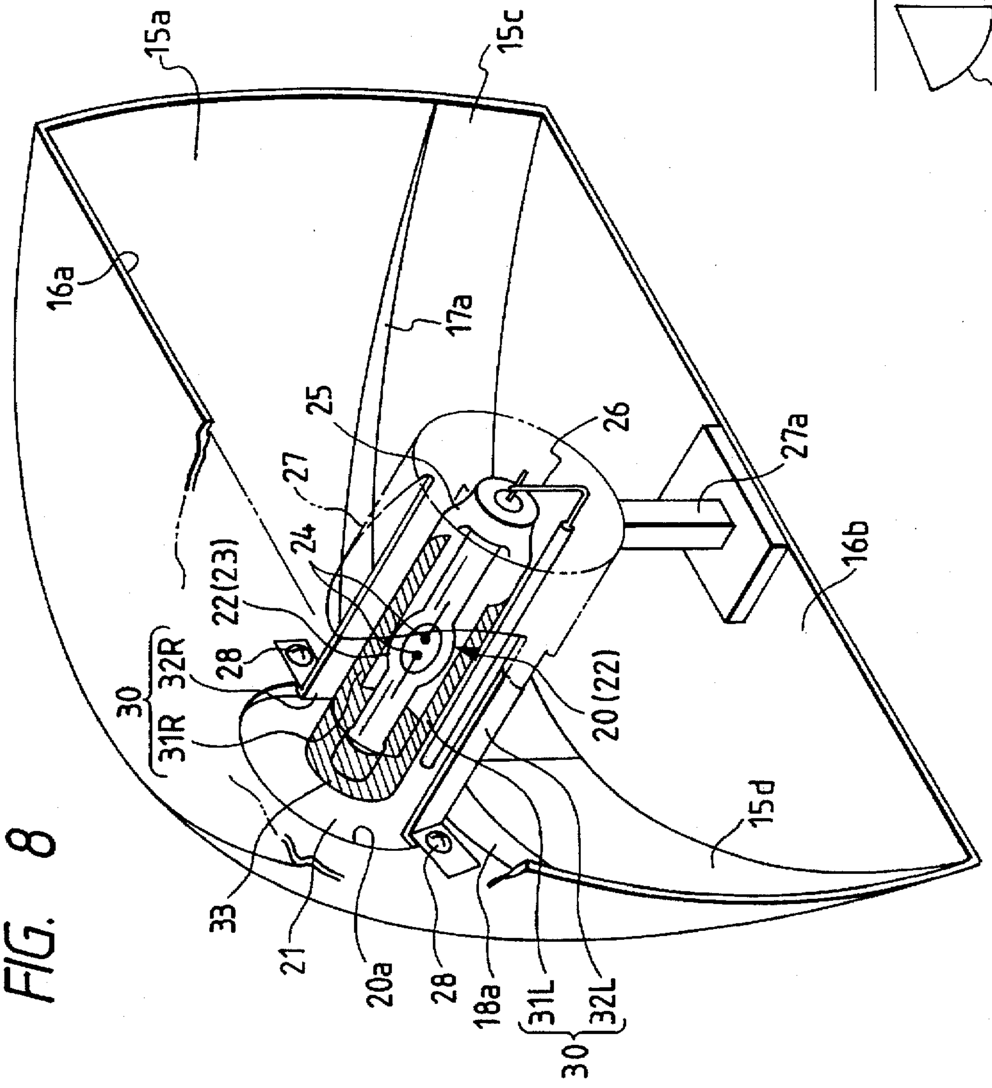
FIG. 8 is a perspective view showing a reflector with a shade structure mounted thereon.
Figure 10:
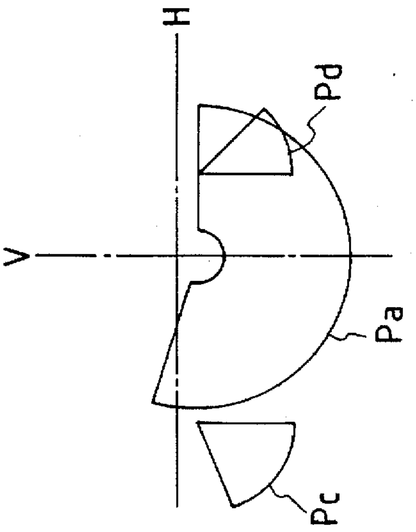
FIG. 10 is a view showing distribution light patterns formed by the reflector of the headlamp of the second embodiment.

FIGS. 7 through 10 cooperate to show a second embodiment of a headlamp for motor vehicles according to the present invention. Of these figures, FIG. 7 is a front view showing the headlamp, FIG. 8 is a perspective view showing a reflector with a shade structure mounted thereon, FIG. 9 is a horizontal sectional view showing the reflector (taken on line IX—IX in FIG. 7) when viewed from the rear side of the reflector, and FIG. 10 is a view showing light distribution patterns formed by the reflector of the headlamp.

In the second embodiment, a third shade 33 is provided on the outer surface of the base part of the globe 25 for cutting ultraviolet-rays. The third shade 33 as a black light-cut coating is continuous to the first shades 31 (31R and 31L). The third shade 33 cuts light directed to a region around the bulb insertion hole 20*a* that does not function as the effective reflecting surface. With provision of the third shade 33, there is no chance that light is reflected in the region around the bulb insertion hole 20*a*, to thereby give rise to glare. Light emanates from a pinched sealing part of the arc tube 22 in unpredictable directions, so that it causes glare highly probably. The third shade 33 effectively operates also to cut the light emanating from the pinched sealing part of the rear end of the arc tube 22. The second shades 32 (32R and 32L) are integrally formed with the cylindrical shade 27. Because of this, the shade structure is simple.

The lower effective reflecting surface of the reflector 14 is divided into a right reflecting surface 15*c* (located on the right side when seeing the front of the reflector) and a left reflecting surface 15*d* (located on the left side when seeing the front of the reflector). An optical axis Lc of the right reflecting surface 15*c* is slanted to the left when seen from a driver's position. An optical axis Ld of the left reflecting surface 15*d* is slanted to the right when seen from the driver's position. The resultant light distribution pattern is more expanded to the road shoulder of the running lane, as shown in FIG. 10. A light distribution pattern Pc by the right reflecting surface 15*c* is thrown onto the road shoulder of the running lane and its vicinity. A light distribution pattern Pd by the left reflecting surface 15*d* is thrown onto the right side of the opposing lane. Accordingly, the driver clearly sees the road shoulder and its vicinity and the opposing lane.

Reference numerals 17*a* and 18*a* designate partition lines (stepped part) between the upper effective reflecting surface 15*a* and the right reflecting surface 15*c* and between the upper effective reflecting surface 15*a* and the left reflecting surface 15*d*. In FIG. 9, Fc and Fd indicate the focal points of the right and the left reflecting surfaces 15*c* and 15*d*.

The remaining constructions of the second embodiment are substantially the same as those of the first embodiment. Therefore, no description of them is given while using like reference numerals for designating like portions.

Figure 11:
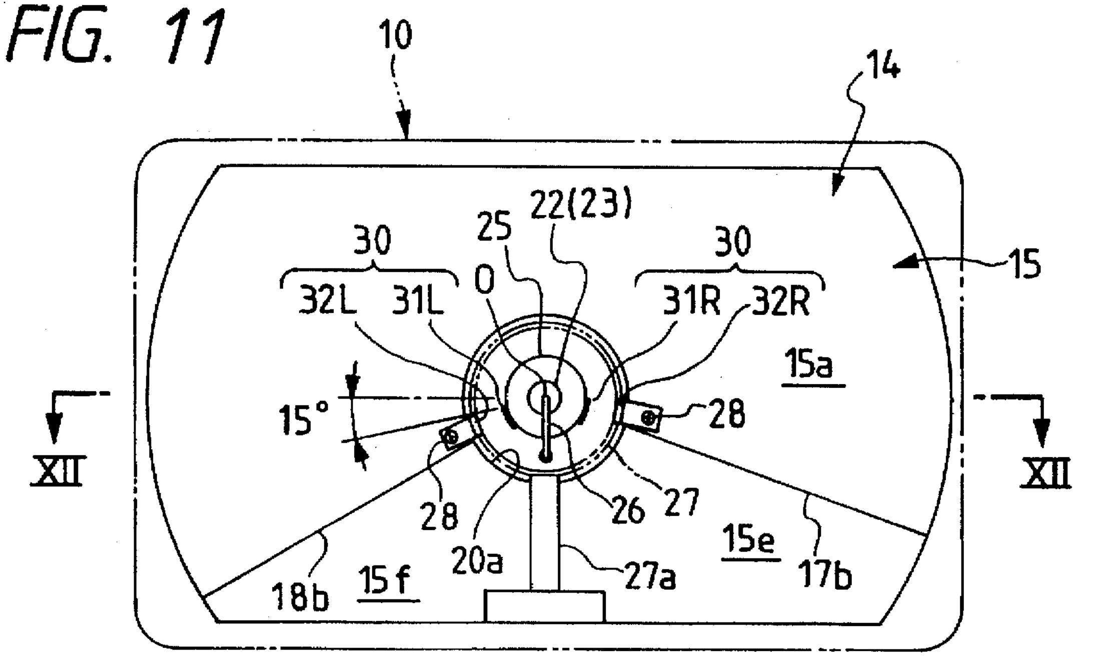
FIG. 11 is a front view showing a headlamp for motor vehicles according to a third embodiment of the present invention.
Figure 12:
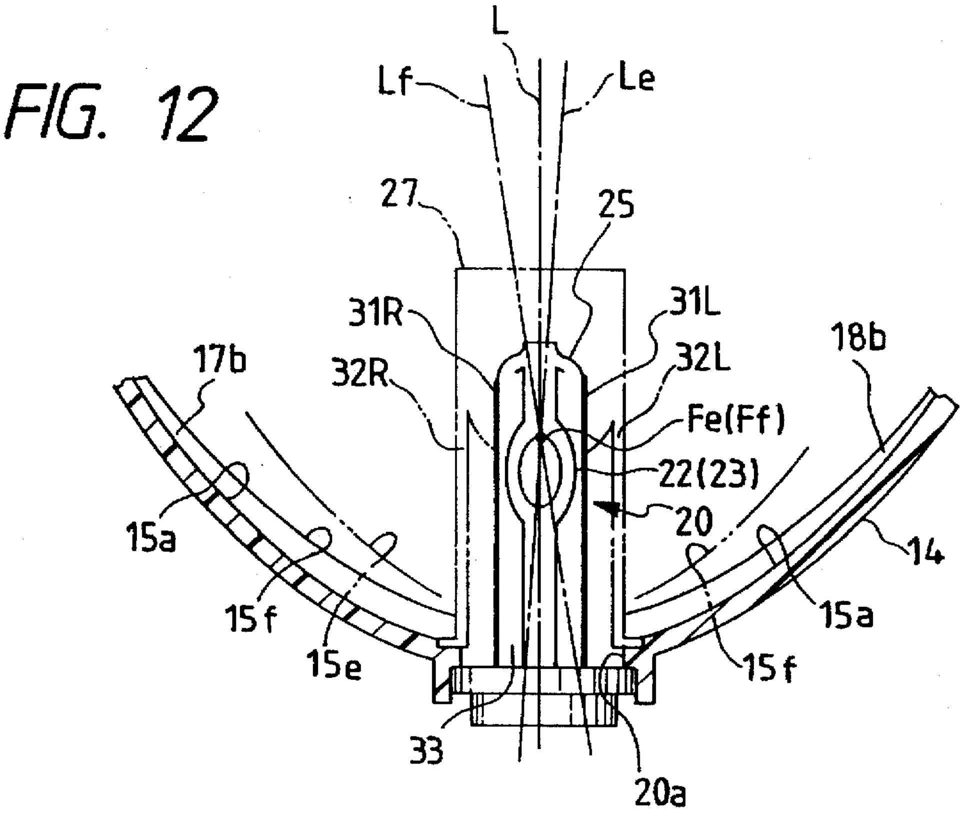
FIG. 12 is a horizontal sectional view showing the reflector (taken on line XII—XII in FIG. 11) when viewed from the rear side of the reflector.
Figure 13:
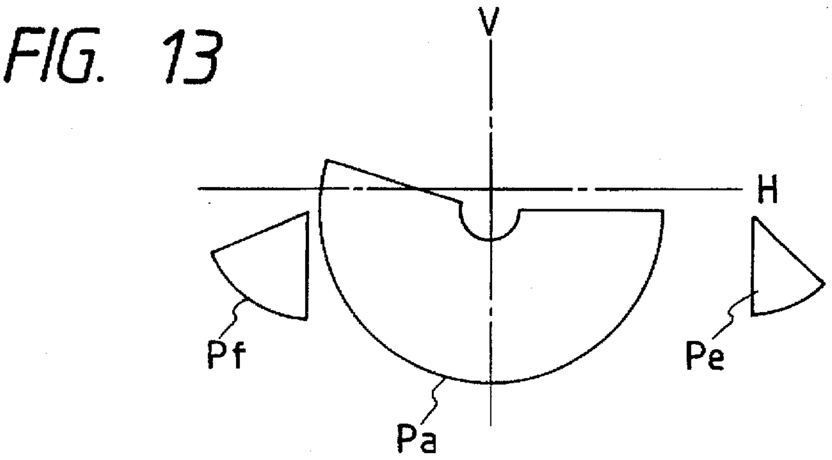
FIG. 13 is a view showing light distribution patterns formed by the reflector of the headlamp of the third embodiment.

FIGS. 11 through 12 cooperate to show a third embodiment of a headlamp for motor vehicles according to the present invention. Of these figures, FIG. 11 is a front view showing the headlamp, FIG. 12 is a horizontal sectional view showing the reflector (taken on line XII—XII in FIG. 11) when viewed from the rear side of the reflector, and FIG. 13 is a view showing light distribution patterns formed by the reflector of the headlamp.

The lower effective reflecting surface of the reflector 14 is divided into the right and the left reflecting surfaces, as in the second embodiment. In the second embodiment, as recalled, the optical axis Lc of the right reflecting surface 15*c* is slanted to the left when seen from a driver's position. The optical axis Ld of the left reflecting surface 15*d* is slanted to the right when seen from the driver's position. In the third embodiment, the optical axis Le of the right reflecting surface 15*e* is slanted a preset angle to the right when seen from a driver's position. The optical axis Lf of the left reflecting surface 15*f* is slanted a preset angle to the left when seen from the driver's position. The resultant light distribution pattern is expanded to the road shoulders of the running lane and the opposing lane, as shown in FIG. 13.

A light distribution pattern Pe formed by the right reflecting surface 15*e* is thrown onto the road shoulder of the opposing lane and its vicinity. A light distribution pattern Pf by the left reflecting surface 15*f* is thrown onto the road shoulder of the running lane and its vicinity. Accordingly, the driver clearly sees the road shoulder of the running lane and the road shoulder of the opposing lane as well. Reference numerals 17*a* and 18*a* designate partition lines (stepped part) between the upper effective reflecting surface 15*a* and the right reflecting surface 15*e* and between the upper effective reflecting surface 15*a* and the left reflecting surface 15*f*. In FIG. 12, Fe and Ff indicate the focal points of the right and the left reflecting surfaces 15*e* and 15*f*.

The remaining constructions of the second embodiment are substantially the same as those of the first and the second embodiments. Therefore, no description of them is given while using like reference numerals for designating like portions.

Figure 14:
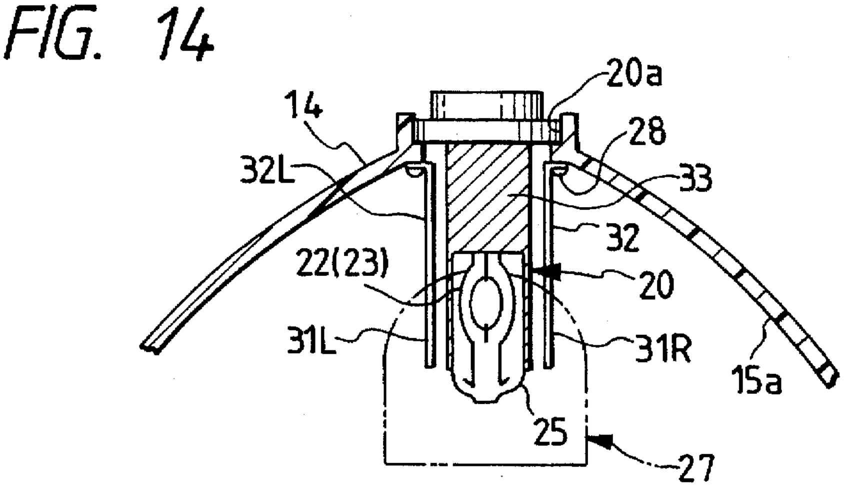
FIG. 14 is a horizontal sectional view showing a reflector with a shade structure, which is a key portion of a headlamp for motor vehicles according to a fourth embodiment of the present invention, the view being given when seen from the front side of the reflector.
Figure 15:
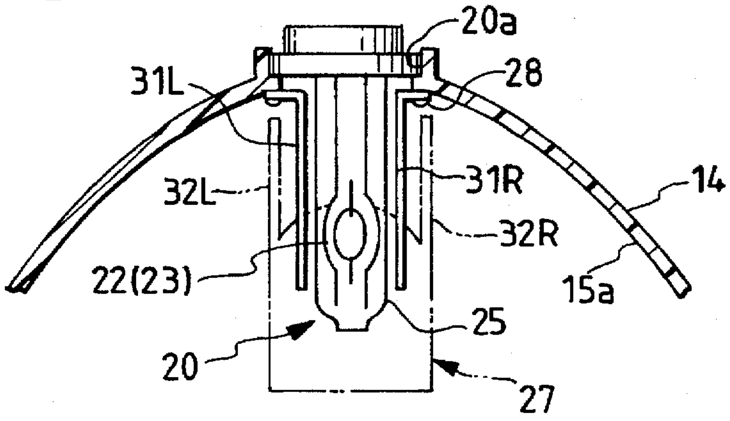
FIG. 15 is a horizontal sectional view showing a reflector with a shade structure, which is a key portion of a headlamp for motor vehicles according to a fifth embodiment of the present invention, the view being given when seen from the front side of the reflector.
Figure 16:
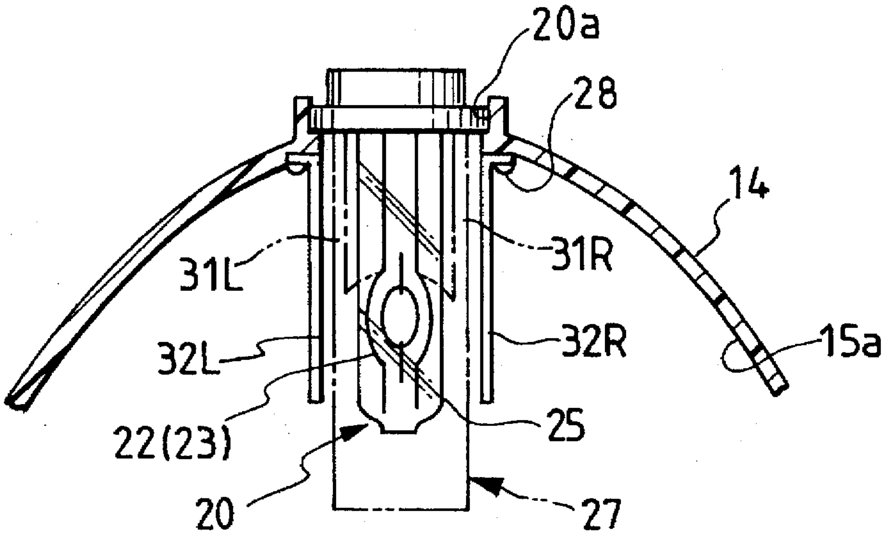
FIG. 16 is a horizontal sectional view showing a reflector with a shade structure, which is a key portion of a headlamp for motor vehicles according to a sixth embodiment of the present invention, the reflector being illustrated when seen from the front side of the reflector.

FIGS. 14 to 16 show fourth to sixth embodiments of a headlamp for motor vehicles according to the present invention.

In the fourth embodiment shown in FIG. 14, a third shade 33 is added to the shade structure in the first embodiment. The third shade 33 is provided on the outer surface of the base part of the globe 25 for cutting ultraviolet-rays. The third shade 33 as a black light-cut coating is continuous to the first shades 31. The third shade 33 cuts the light emanating from a pinched sealing part of the rear part of the arc tube 22, which possibly leads to glare, and cuts light directed to a region around the bulb insertion hole 20*a* that does not function as the effective reflecting surface.

In the fifth embodiment shown in FIG. 15, second shades 32 (32R, 32L), which is integrally formed with the cylindrical shade 27, are disposed outside the first shades 31 (31R and 31L), which are fastened to the part near the circumferential edge of the bulb insertion hole 20*a* by screws and extend along the arc tube 22.

In the sixth embodiment shown in FIG. 16, the diameter of the cylindrical shade 27 is slightly larger than the outside diameter of the arc tube 22. The first shades 31 (31R, 31L) are integrally formed with the cylindrical shade 27. The second shades 32 (32R, 32L), disposed outside the first shades 31 (31R, 31L), are shaped like metal webs, which are made of the same material as of the cylindrical shade 27. The bases of those shades are secured, by means of screws 28, to the part near the circumferential edge of the bulb insertion hole 20*a*.

Figure 18:
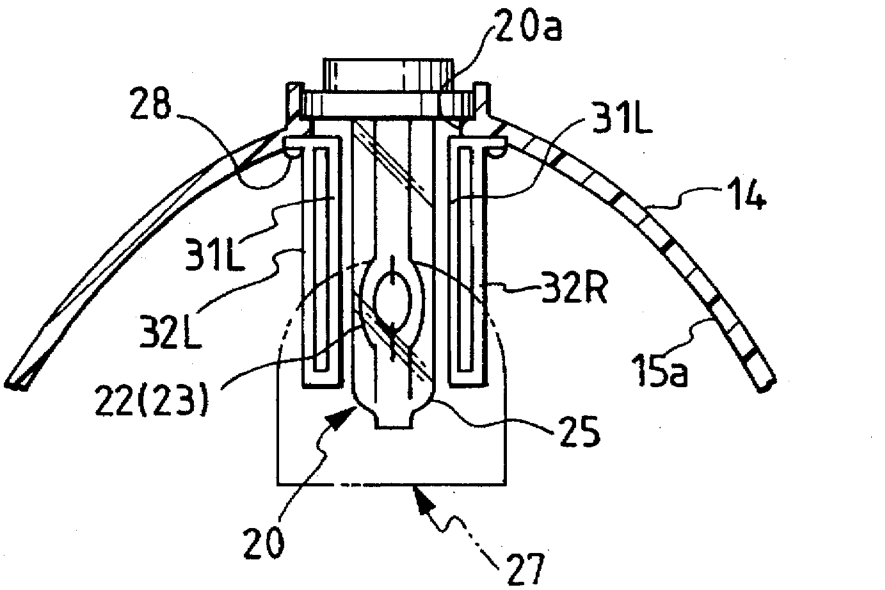
FIG. 18 is a horizontal sectional view showing the reflector when viewed from the front side of the reflector.
Figure 17:
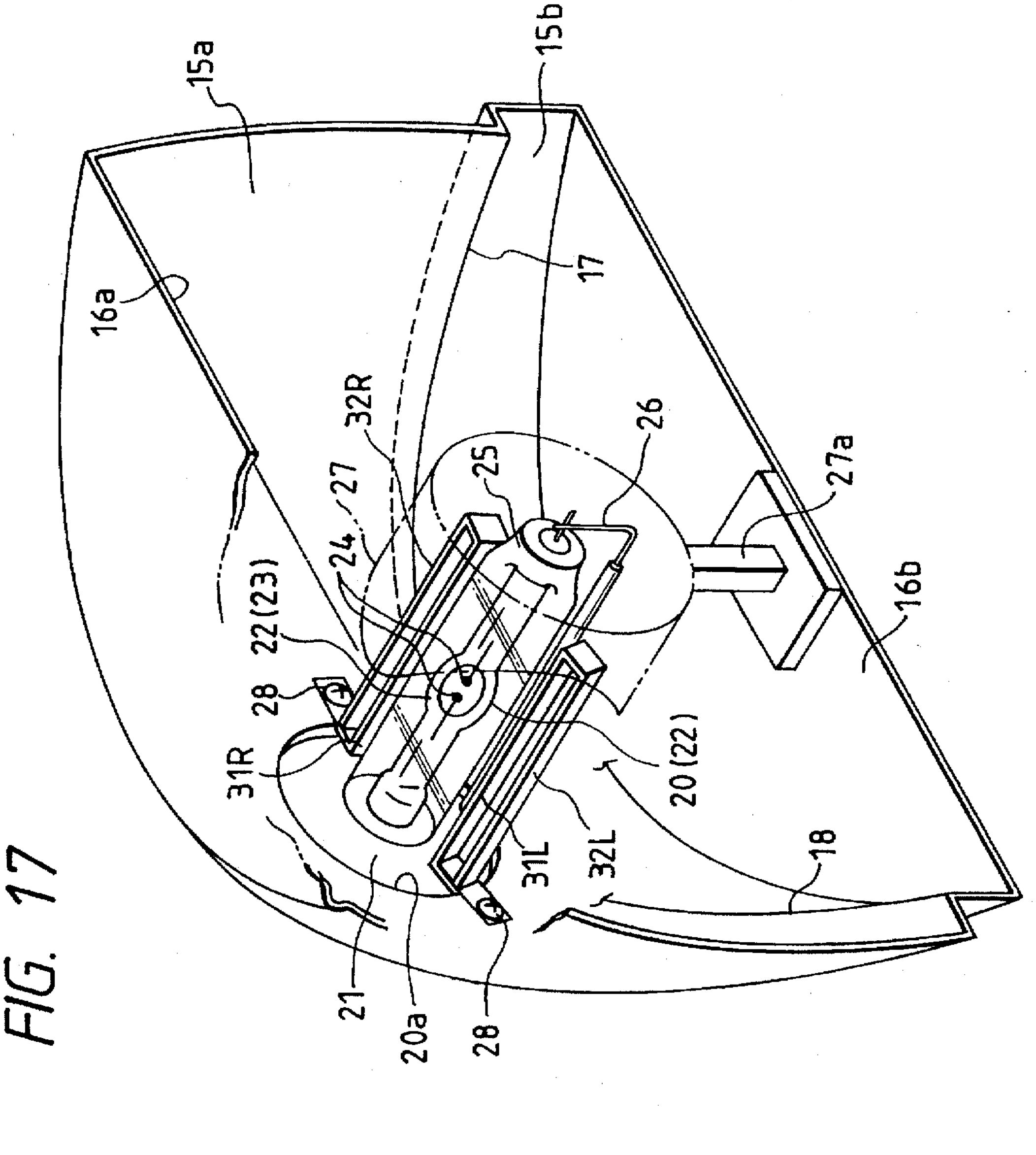
FIG. 17 is a perspective view showing a reflector with a shade structure mounted thereon in a seventh embodiment of a headlamp for motor vehicles according to the present invention.

FIGS. 17 and 18 cooperate to show a seventh embodiment of a headlamp for motor vehicles according to the present invention.

FIG. 17 is a perspective view showing a reflector with a shade structure mounted thereon, and FIG. 18 is a horizontal sectional view showing the reflector when viewed from the front side of the reflector.

In the seventh embodiment, the first shades 31 (31R, 31L) are integrally formed with the second shades 32 (32R, 32L). These shades are fastened at the base to a part near the circumferential edge of the bulb insertion hole 20*a* by means of screws 28. The shades may be manufactured by molding synthetic resin or molding or welding metal plates. Since the first shades 31 are integrally formed with the second shades 32, the shade structure is simple and may easily be mounted on the reflector 14.

Figure 19:
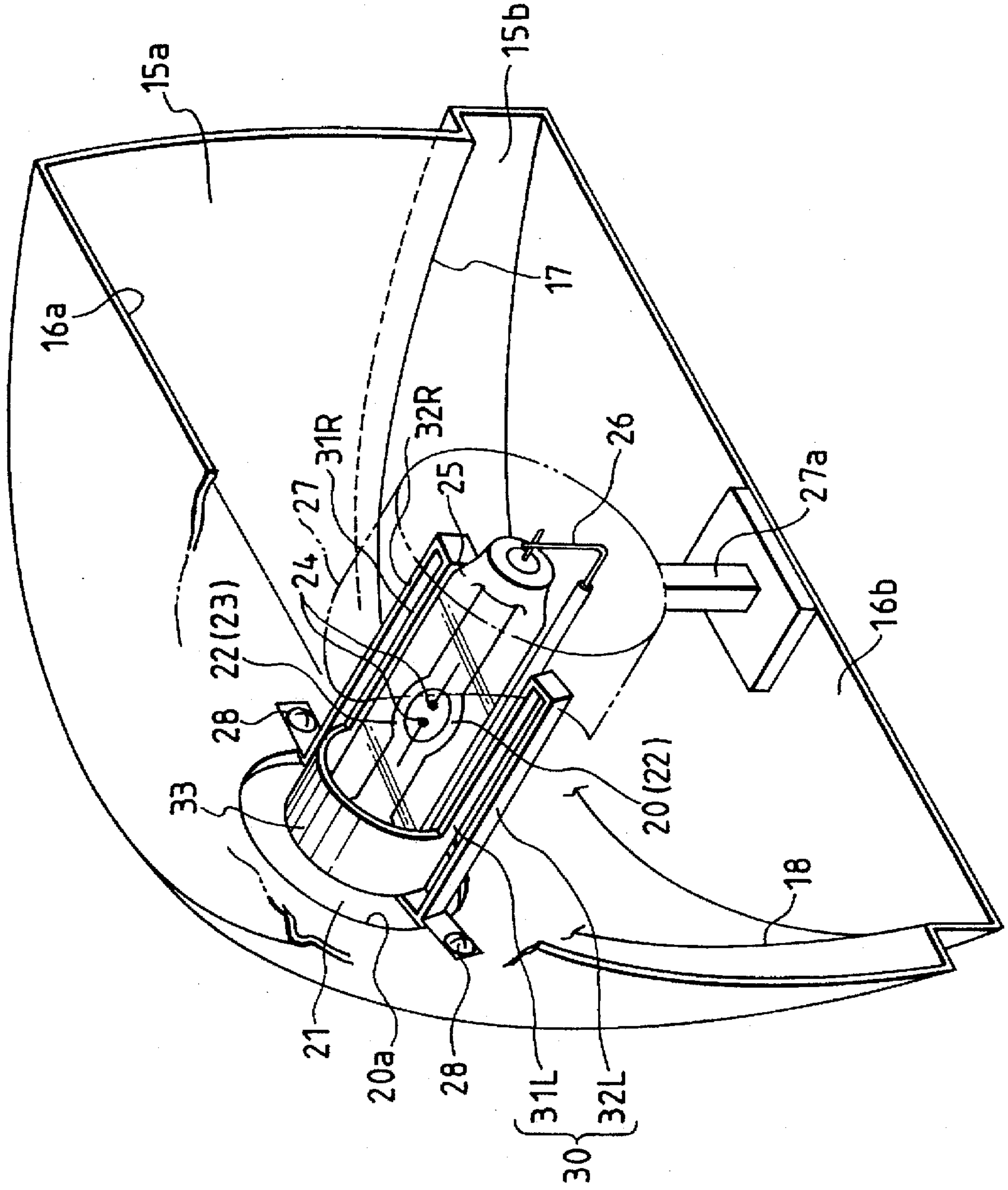
FIG. 19 is a perspective view showing a reflector with a shade structure mounted thereon in an eighth embodiment of a headlamp for motor vehicles according to the present invention.
Figure 20:
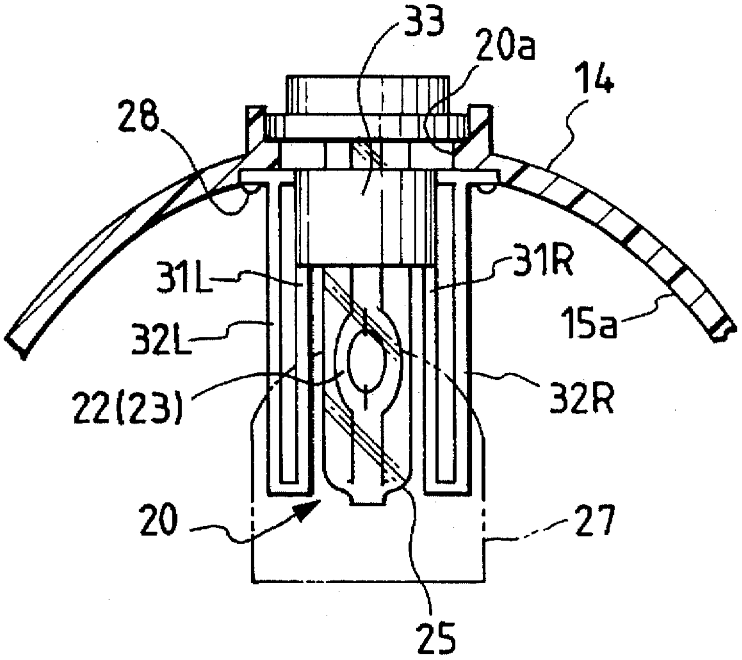
FIG. 20 is a horizontal sectional view showing the reflector when viewed from the front side of the reflector.

FIGS. 19 and 20 cooperate to show an eighth embodiment of a headlamp for motor vehicles according to the present invention.

FIG. 19 is a perspective view showing a reflector with a shade structure mounted thereon, and FIG. 20 is a horizontal sectional view showing the reflector when viewed from the front side of the reflector.

In the eighth embodiment, the third shade 33 for cutting the light emanating from a pinched sealing part of the rear part of the arc tube 22, and light directed to the vicinity of the bulb insertion hole 20*a*, are constructed with light cutting members made of the same material as of the cylindrical shade 27. Further, the first shades 31, the second shades 32, and the third shade 33 are integrally formed.

The remaining constructions of the eighth embodiment are substantially the same as those of the first embodiment. Therefore, no description of them is given while using like reference numerals for designating like portions.

Figure 22:
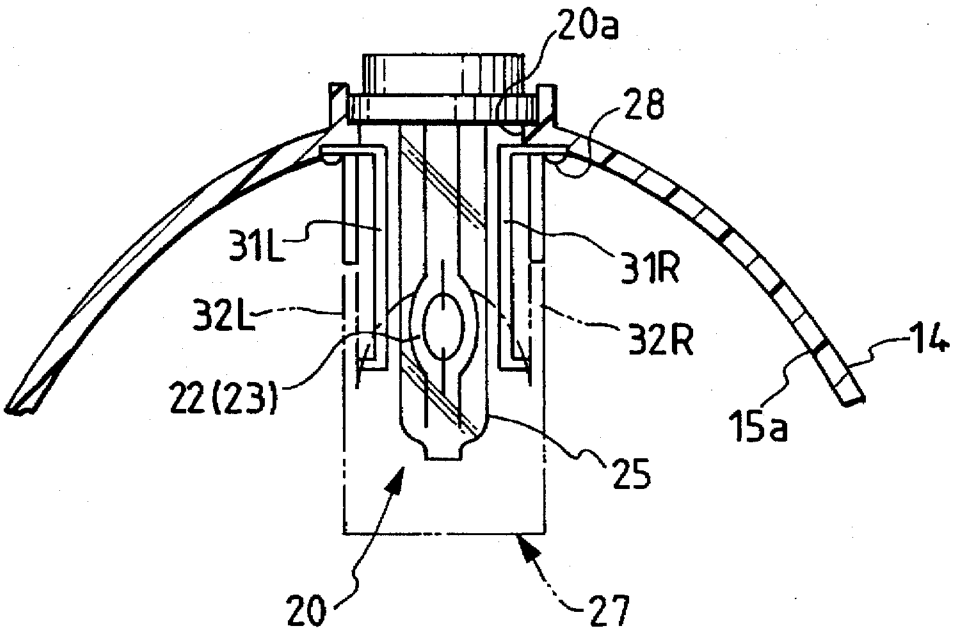
FIG. 22 is a horizontal sectional view showing the reflector when viewed from the front side of the reflector.
Figure 21:
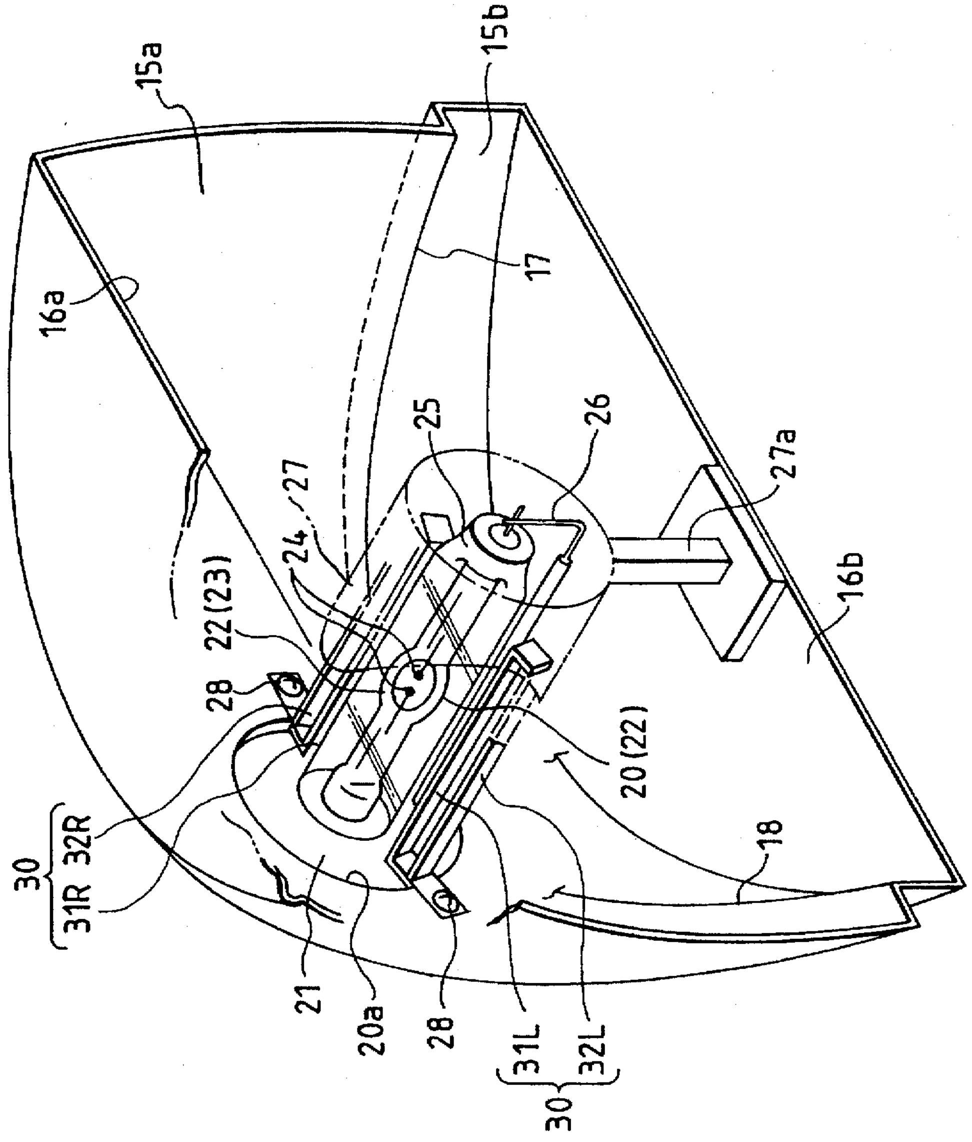
FIG. 21 is a perspective view showing a reflector with a shade structure mounted thereon in a ninth embodiment of a headlamp for motor vehicles according to the present invention.
Figure 23:
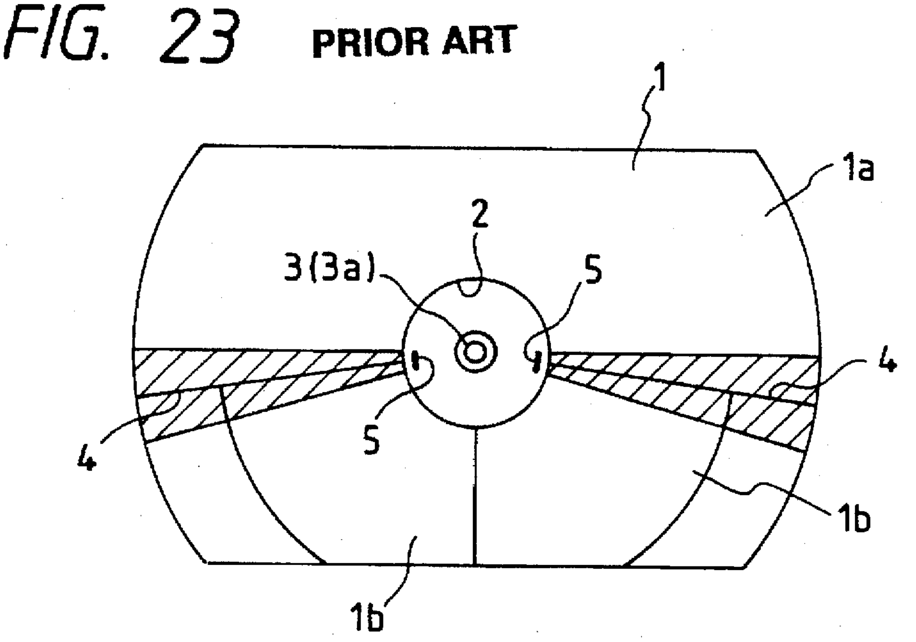
FIG. 23 PRIOR ART
FIG. 23 is a front view showing a proposed headlamp.
Figure 24:
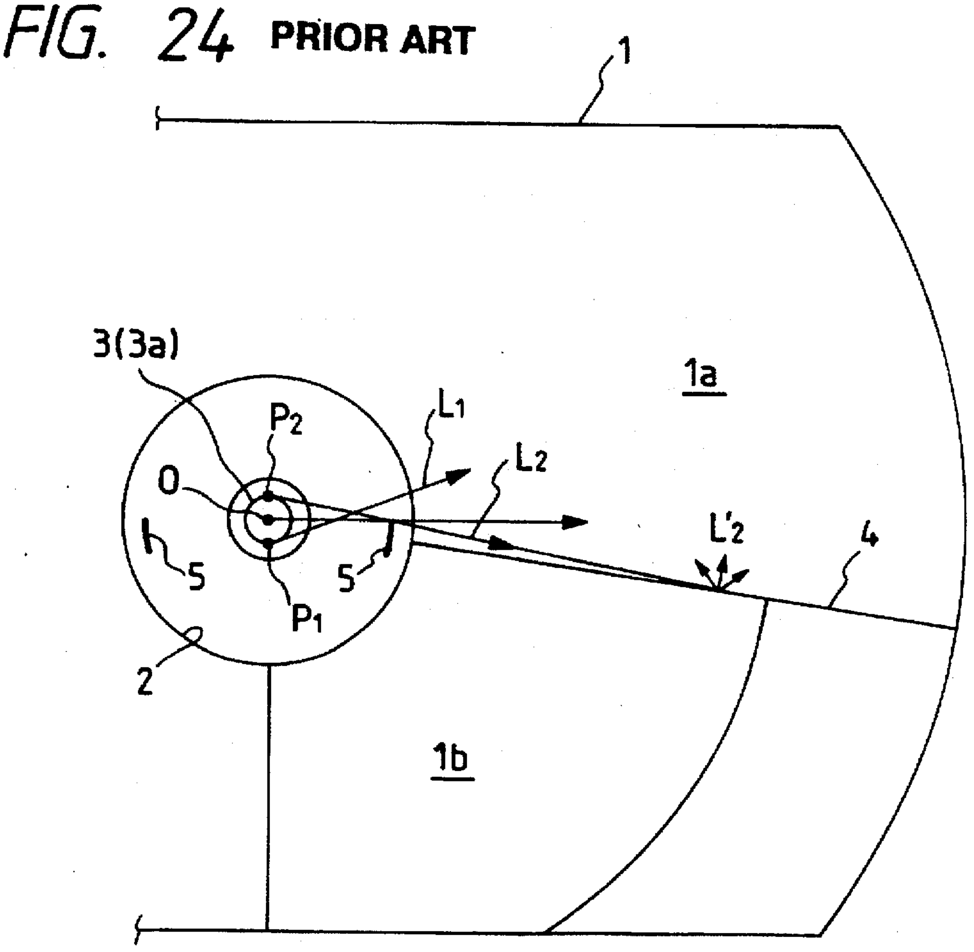
FIG. 24 PRIOR ART
FIG. 24 is a diagram for explaining a cause of glare.
Figure 25:
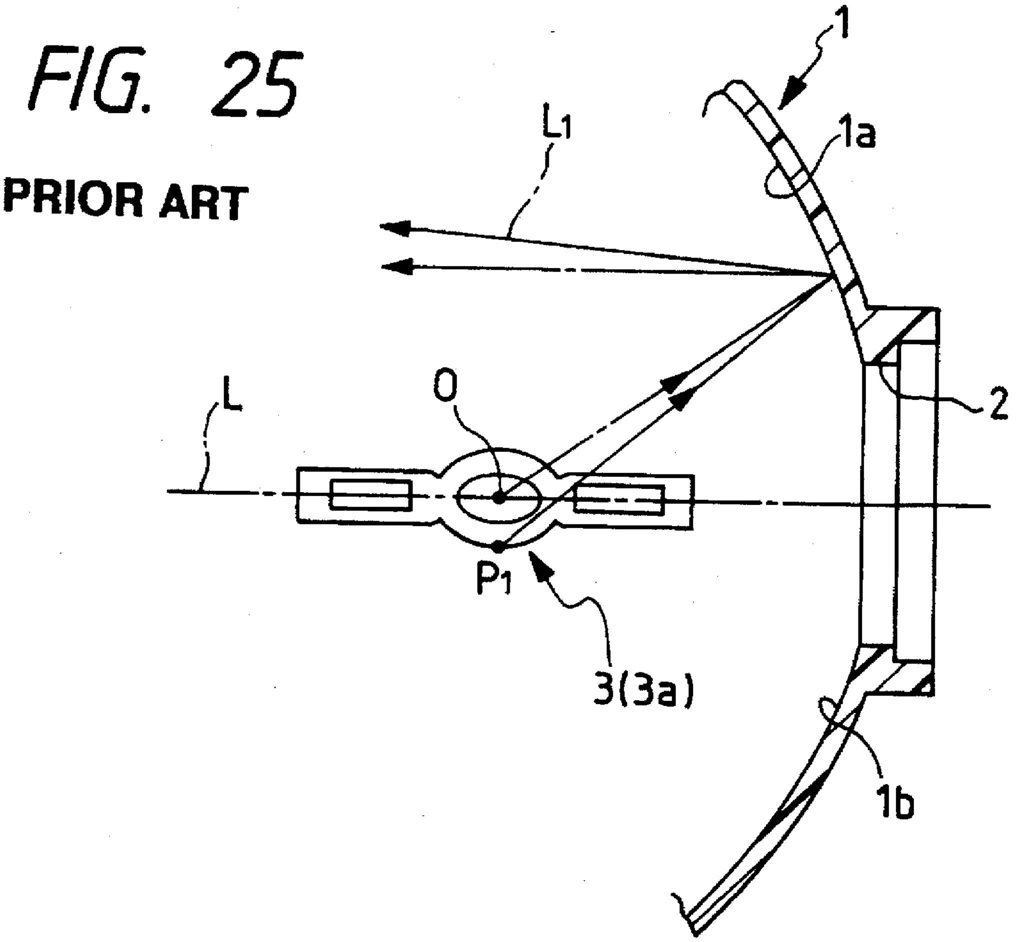
FIG. 25 PRIOR ART
FIG. 25 is a diagram for explaining another cause of glare.
Figure 26:
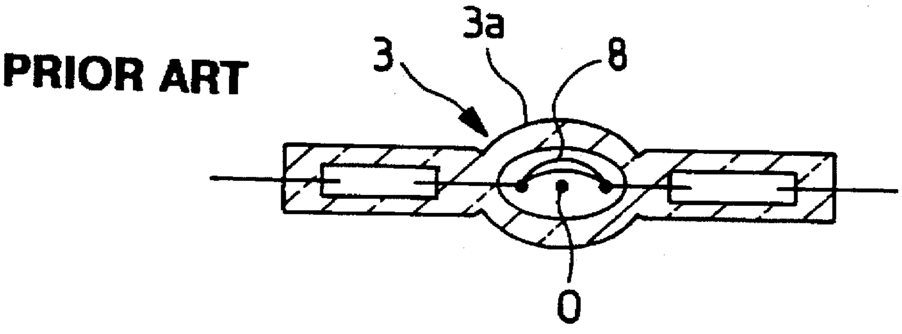
FIG. 26 PRIOR ART
FIG. 26 is a diagram for explaining an arc occurring between the electrodes.

FIGS. 21 and 22 cooperate to show a ninth embodiment of a headlamp for motor vehicles according to the present invention. FIG. 21 is a perspective view showing a reflector with a shade structure mounted thereon, and FIG. 22 is a horizontal sectional view showing the reflector when viewed from the front side of the reflector.

In the ninth embodiment, the first shades 31 (31R, 31L) and the second shades 32 (32R, 32L) are integrally formed with the cylindrical shade 27. The advantage of the ninth embodiment resides in that the required number of part components is reduced.

The remaining constructions of the ninth embodiment are substantially the same as those of the first embodiment. Therefore, no description of them is given while using like reference numerals for designating like portions.

In the first to eighth embodiments, the present invention is applied to the headlamp of the type in which the reflector having the effective reflecting surface is contained in the lamp body. It is evident that the invention is applied to the headlamp of the type in which the effective reflecting surface is formed on the inner surface of the lamp body.

As seen from the foregoing description, in the headlamp for motor vehicles of the present invention, since the first shades is located close to the arc tube, the light beam, which emits from a position lower than the electrode center of the sealed glass tube and directs to the upper effective reflecting surface, is surely cut by the first shades. Accordingly, no glare is caused by the reflection of light on the effective reflecting surface. The low beam having a sharp clear cutting line is formed.

The light beams that pass above the first shades and direct to the partition lines of the upper and the lower effective reflecting surfaces are surely cut by the second shades provided outside the first shades. Accordingly, no glare is caused by the reflection of light on the effective reflecting surface. No glare is seen by a driver in the vehicle running on the opposing lane.

The first and the second shades are both located close to the arc tube. This leads to size reduction of the shade structure.

Further, the second shades that cut the light beam directing from the arc tube to the partition lines does not interrupt the formation of the clear cutting line by the first shades. The clear cutting line of the low beam is sharp.

Furthermore, the first shades are integrally formed with the globe for cutting ultra-violet rays. Accordingly, the required number of part components is reduced. Further, the first shades are automatically set at a preset position by merely inserting the discharge bulb into the bulb insertion hole. The mounting of the shades is easy.

What is claimed is:

1. A headlamp for motor vehicles, comprising:

a reflector having a paraboloidal effective reflecting surface;

a bulb insertion hole formed at a rear top of said reflector;

a discharge bulb coupled to said bulb insertion hole, said discharge bulb comprising a sealed glass bulb, an arc tube accommodated in said glass tube, and a pair of electrodes housed in said sealed glass bulb, said electrodes positioned oppositely of each other in a front-rear direction of the headlamp, a center of said paired electrodes being substantially coincident with a focal point of said effective reflecting surface;

a front lens provided in front of the effective reflecting surface, said effective reflecting surface comprising an upper effective reflecting surface having a focal point positioned at a point closer to said effective reflecting surface than said center of said electrodes, and a lower effective reflecting surface having a focal point positioned at a point closer to said front lens than said center of electrodes, said upper and lower effective reflecting surfaces defining a partition line therebetween;

a pair of shades disposed on both sides of said arc tube for cutting light directed from said sealed glass bulb to said partition line and contributing to formation of clear cutting lines of low beams, said paired shades comprising:

a pair of first shade members, disposed close to said arc tube, for cutting light emitter from a lower side of said sealed glass bulb and directed to said upper effective reflecting surface;

and a pair of second shade members, disposed outside and close to said first shade members, for cutting light emitted from said sealed glass bulb and directed to said partition lines without being intercepted by said first shades.

2. The headlamp according to claim 1, wherein said second shade members comprise upper edges that are located not higher than a plane containing said center of said electrodes and the upper edges of said first shade members.

3. The headlamp according to claim 1 or 2, wherein said arc tube of said discharge bulb is enclosed with a glass globe for cutting ultra-violet rays, and said first shades are light-cut coatings applied to said globe for cutting ultra-violet rays.

4. The headlamp according to claim 3, further comprising a third shade member disposed on an outer surface of a base part of said globe, said third shade member serving as a black light-cut coating is formed continuous to said first shade members.

5. The headlamp according to claim 1, wherein said shades are formed of an aluminum plated iron plate which is subjected to a baking treatment to be colored black, and shaped into a cylindrical body.

6. The headlamp according to claim 1, wherein said first shade members are coated with material for cutting light, which contains one of alumina ($Al_2O_3$) and silica ($SiO_2$).

7. The headlamp according to claim 1, wherein an upper edge of one of said first shade members is on a horizontal line including said center of said electrodes.

8. The headlamp according to a claim 1, wherein a lower edge of one of said first shade members extends to a point where said lower edge cuts light emitting from the bottom center of said sealed glass bulb and directs said light to said partition line.

9. The headlamp according to claim 1, wherein an upper edge of another of said first shade members is on a line slanted down 15° with respect to said center of said electrodes.

10. The headlamp according to claim 1, wherein a upper edge of another of said first shade members is lower than the upper edge of one of said first shade members.

11. The headlamp according to claim 1, wherein a lower edge of one of another of said first shade members and of said second shade members extends up to a position where said lower edge cuts light emitting from a bottom center of said sealed glass bulb and directs said light to said partition line.

12. The headlamp according to claim 1, wherein said second shade members are arranged in parallel with said first shade members.

13. The headlamp according to claim 1, wherein said second shade members comprise upper edges positioned so as to cut light emitting from a top center of said sealed glass bulb, passing above said first shade members, and directed to said partition lines.

14. The headlamp according to claim 1, wherein said second shade members comprise an upper edge located not higher than a plane including a center of said electrode and an upper edge of one of said first shade members.

15. The headlamp according to claim 1, further comprising a cylindrical shade mounted on a lower wall of a reflector by a leg.

16. The headlamp according to claim 15, wherein said first shade members are fastened to a part near a circumferential edge of said bulb insertion hole by screws and extend along said arc tube, said second shade members are integrally formed with said cylindrical shade, and said second shade members are disposed outside said first shade members.

17. The headlamp according to claim 15, wherein a diameter of said cylindrical shade is slightly larger than an outside diameter of said arc tube, the first shade members are formed integrally with said cylindrical shade, and the second shade members disposed outside said first shade members are shaped like metal webs, which are made of the same material as of said cylindrical shade, bases of said cylindrical shade and said shade members are secured, by means of screws, to the part near the circumferential edge of said bulb insertion hole.

18. The headlamp according to claim 15, further comprising a third shade member for cutting a light emanating from a pinched sealing part of the rear part of said arc tube and light directed to a vicinity of said bulb insertion hole, constructed with light cutting members made of the same material as said cylindrical shade, and said first, second and third shade members are integrally formed.

19. The headlamp according to claim 1, wherein said second shade members are formed integrally with a cylindrical shade.

20. The headlamp according to claim 1, further comprising a third shade disposed on an outer surface of a base part of said sealed glass bulb of said discharge bulb, said third shade serving as a black light-cut coating being formed continuously to said first shade members, said third shade cutting the light emanating from a pinched sealing part of a rear part of said arc tube, which possibly leads to glare, and cutting light directing to a region around said bulb insertion hole that does not function as the effective reflecting surface.

21. The headlamp according to claim 1, wherein said first shade members are formed integrally with said second shade members, and said first and second shade members are fastened at a base to a part near a circumferential edge of said bulb insertion hole by means of screws.

22. The headlamp according to claim 21, wherein said first and second shade members are manufactured by molding synthetic resin or molding or welding metal plates.

* * * * *